US012728379B2

(12) United States Patent
Heffler et al.

(10) Patent No.: US 12,728,379 B2
(45) Date of Patent: Sep. 8, 2026

(54) METHOD AND APPARATUS FOR TREATING AIR WITH ALPHA RADIOISOTOPE IONIZATION

(71) Applicant: NRD LLC, Grand Island, NY (US)

(72) Inventors: Kevin Richard Heffler, Youngstown, NY (US); Michael Edward Reilly, Niagara Falls, NY (US)

(73) Assignee: NRD LLC, Grand Island, NY (US)

( * ) Notice: Subject to any disclaimer, the term of this patent is extended or adjusted under 35 U.S.C. 154(b) by 543 days.

(21) Appl. No.: 18/324,535

(22) Filed: May 26, 2023

(65) Prior Publication Data

US 2023/0381707 A1 Nov. 30, 2023

Related U.S. Application Data

(60) Provisional application No. 63/365,455, filed on May 27, 2022.

(51) Int. Cl.
*B01D 53/00* (2006.01)
*G21H 5/00* (2006.01)

(52) U.S. Cl.
CPC ............. *B01D 53/007* (2013.01); *G21H 5/00* (2013.01); *B01D 2258/06* (2013.01); *B01D 2259/80* (2013.01)

(58) Field of Classification Search
CPC .......... B01D 53/007; B01D 2259/4575; B01D 2257/504; B01D 53/1475; G21H 5/00; H01T 23/00
USPC .................. 204/157.3; 95/57–81; 96/15–100
See application file for complete search history.

(56) References Cited

U.S. PATENT DOCUMENTS

| | | | | |
|---|---|---|---|---|
| 4,227,085 | A | 10/1980 | Sunde | |
| 8,564,924 | B1 | 10/2013 | Waddell | |
| 8,861,167 | B2 | 10/2014 | Waddell | |
| 11,569,641 | B2 | 1/2023 | Willden et al. | |
| 2012/0287551 | A1 | 11/2012 | Waddell | |
| 2022/0001072 | A1 | 1/2022 | Davidson | |
| 2022/0048046 | A1 | 2/2022 | Levine | |
| 2022/0158419 | A1* | 5/2022 | Willden | H01T 23/00 |
| 2023/0241280 | A1* | 8/2023 | Shaarabany | F24F 8/22 250/435 |

OTHER PUBLICATIONS

Staticmaster® Linear Rail Ionizers, Models 2U500 Rail, 1U400 Rail & 1U200 Rail Alpha, NRD, LLC, Grand Island, NY.
NUCLESTAT® Linear Ionizers, Model P-2001 & P-2001-1, NRD, LLC, Grand Island, NY.

(Continued)

*Primary Examiner* — Jennifer Dieterle
*Assistant Examiner* — Rachel Marie Slaugovsky
(74) *Attorney, Agent, or Firm* — Simpson & Simpson, PLLC

(57) ABSTRACT

A device for treating air with alpha radioisotope ionization, comprising a frame having an internal surface, the internal surface defining an internal space, a pair of internal brackets arranged within the internal space and removably connected to the frame, each internal bracket arranged to have at least one spacer arranged between the respective bracket and the internal surface of the frame, and at least one alpha ionizing apparatus removably connected to the pair of internal brackets.

20 Claims, 8 Drawing Sheets

(56) References Cited

OTHER PUBLICATIONS

Dr. Stacy L. Daniels, Applications of Air Ionization for Control of VOCs and PMx, Paper #918 (Session AB-7a: Advances in, and Evaluation of, IAQ Control).
Dr. Stacy L. Daniels, Control of Volatile Organic Compounds and Particulate Matter in Indoor Environments of Airports by Bipolar Air Ionization, May 2002.
Yee, Dana, Respiratory Syncytial Virus (RSV) Aerosol Efficacy Testing, Innovative Bioanalysis Laboratory Project No. 1034-R, Jul. 26, 2021.
Yee, Dana, Influenza B Virus Aerosol Efficacy Testing, Innovative Bioanalysis Laboratory Project No. 1034-B, Jul. 26, 2021.
Yee, Dana, Influenza A Virus Aerosol Efficacy Testing, Innovative Bioanalysis Laboratory Project No. 1034-A, Jul. 26, 2021.
Yee, Dana, Efficacy of the GPS-FC48-AC Against SARS-COV2 Delta Variant, Innovative Bioanalysis Laboratory Project No. 1159, Sep. 20, 2021.
Bosse Ion-Cloud, https://www.bosse.de/en/products/hygiene/ion-cloud.

* cited by examiner 100
10
10a
10b
10c
10d
76
80
78
82
70
72
74
14a
14b
56
62
60
58
12a
64
68
66
106
26
24
28
112
108
104
110
98
102
94
92
14d
96
88
86
84
22
90
14c
30
42
34
46
38
50
20a
20b
20c
20
32
44
36
48
40
52

METHOD AND APPARATUS FOR TREATING AIR WITH ALPHA RADIOISOTOPE IONIZATION

FIELD

The present disclosure relates to a system and method for treating indoor air with alpha radioisotope ionization.

BACKGROUND

Ionizing radiation takes a few forms: Alpha, beta, neutron, gamma, and X-rays. All types are caused by unstable atoms, which have either an excess of energy or mass (or both). In order to reach a stable state, they must release that extra energy or mass in the form of radiation. Alpha radiation is defined by the emission of an alpha particle from the nucleus of an atom.

Alpha radiation occurs when an atom undergoes radioactive decay, giving off a particle (called an alpha particle) consisting of two protons and two neutrons (essentially the nucleus of a helium-4 atom), changing the originating atom to one of an element with an atomic number 2 less and atomic weight 4 less than it started with. Due to their charge and mass, alpha particles interact strongly with matter, and only travel a few centimeters in air. Alpha particles have very low penetration ability and therefore are unable to penetrate the outer layer of dead skin cells, or a sheet of paper. Alpha emitter devices should not be ingested as their energy is strong enough to damage live tissue cells.

Alpha ionization has a positive impact on Indoor Air Quality (IAQ). This is accomplished by increasing the ion density in airflow within indoor environments. Increased ion density in indoor air has multiple benefits to human health, in part, by agglomerating particulate matter such as dust, dander, soot, smoke particles, pollen, mold, bacteria, and viruses. Ions with both positive and negative electrical charges attract particles of opposite electrical charge in air causing them to stick together and drop out of the breathing zone due to increased mass. Additionally, filtration efficacy is improved as the increased size of agglomerated particulate matter is easier to capture in filter media. Filter media is commonly classified with MERV or HEPA ratings. Further, these same ions can remove volatile organic compounds, odorous gasses, bacteria, viruses (deactivation), and eliminate other harmful contaminants from breathing air by bonding, oxidizing and/or neutralizing the air contaminant through the ionization process of electron stripping and oxygen and hydrogen radical formation.

Harmful indoor gases are ever present in air and are "released" from newer building materials, home furnishings containing polyurethanes and multiple other nondurable goods. Work from home offices, company office environments and the greater reliance and use of machines, such as photocopiers and printing equipment is especially problematic as this equipment may emit volatile organic compounds and particulate matter, highly contributing to unhealthy indoor air quality. These particulates degrade the quality of the air, making it less pleasant and even dangerous to occupants of the space. Modern construction techniques that promote energy efficiency, such as spray foam insulated walls, ceilings, doors and windows, and wrapping buildings with air intrusion barriers, have created spaces that are extremely airtight which prevents buildings from being able to off-gas toxic elements. These airtight buildings and homes have less natural ionization, giving way to breathing difficulties for those that are especially vulnerable to airborne particles, volatile organic compounds (VOCs), and contaminations.

During their decay process, alpha particles react with air molecules made up of oxygen and nitrogen and strip electrons from the oxygen and nitrogen electron shells to form ions with both positive and negative charges. Within the $\alpha$ (Alpha) particle region closest to the sealed source the number of ions produced is enormous. It is estimated that one (1) micro curie of activity can generate upwards of six (6) billion ion pairs per second. The voluminous number of ions created through this natural decaying process remains inherently safe and provides efficacy for the improvement of indoor air quality.

Proprietary to this technology is the ability to influence positive and/or negative ion density by "biasing" the Alpha Emitter. When applying a specific voltage bias the level of cations (positive ions) and anions (negative ions) can be influenced as needed for specific applications. The Alpha Radioisotope Ionization generation process is virtually undetectable for ozone and performs far better than electrical ionizer technology when measured using today's industry standards by Underwriters Laboratories standard UL867 as well as the more stringent UL2998 indoor air purification standard.

Radioisotope—(how it Forms)

Alpha emitting ionizers have been commercially used for decades, most commonly as static eliminators. The synthetic process of creating alpha emitters for commercial use is performed by irradiating stable elements, such as Bismuth-209 ($^{209}$Bi) in a controlled nuclear reactor. A nuclear reactor changes $^{209}$Bi by bombarding the isotope with neutrons until the element gains an additional neutron thereby transforming it into Bismuth-210 ($^{210}$Bi). Upon completion of an irradiation event the $^{210}$Bi becomes an unstable element whereas the new isotope $^{210}$Bi begins a process called radioactive decay. This process is a natural phenomenon by which elements transition themselves through decay as the element seeks to become a stable element once again.

$^{210}$Bi does this through a Beta ($\beta$) emission decay process transforming itself to Polonium-210 ($^{210}$Po). This is a similar process by which thousands of life saving radiopharmaceutical isotopes are created for the treatment of many types of diseases such as cancer. This process is also used in medical diagnosis and medical imaging. The alpha radioisotope ionization system and delivery method involves sealing the radioactive $^{210}$Po material in multiple layers of metallization to contain the active polonium for safe and effective use. The $^{210}$Po sealed source decays through Alpha ($\alpha$) emission and thereby emits alpha ($\alpha$) particles.

These $\alpha$ particles are high energy particles with a decay energy value of 5.407 MeV. The $\alpha$ particles travel at 5-7% the speed of light, or 20,000,000 meters per second and are highly ionizing within a 3.0 cm distance of air from the originating alpha source creating billions of ions as they travel. Their highly ionizing characteristics make them incapable of penetrating matter deeper than 0.04 mm, and therefore they cannot penetrate a sheet of paper or even the outer layer of human skin making them inherently safe when used properly and when the source is outside the human body. Alpha emitters should not be swallowed or ingested. Alpha particles generated from $^{210}$Po make them an ideal and safe material to be used for indoor air quality (IAQ) enhancement applications.

Ionization energy, measured in electron volts, is the amount of energy that is required to remove an electron from an isolated atom or molecule. The continuous process of gaining or losing an electron from an atom or molecule creates the process called ionization. The catalyst for the creation of ionization in this field of invention utilizes radioisotope energy in the form of safe alpha emitting particles.

Indoor Air Quality (IAQ) is harmfully affected by normal household activities such as cooking, heating, cooling, breathing, illness, lack of proper filtration, polluted makeup air used in HVAC, building materials and furnishings used in the home. Poor indoor air quality is a major contributor to overall health issues and there is a global focus on improving IAQ. Indoor air quality is affected by airborne particles from diesel exhaust, dust, smoke and other sources; indoor formaldehyde from building materials, furniture, cooking and smoking; household odors and gases from activities such as painting, cooking and smoking; ozone from outdoor air (ground level ozone is harmful to breathe); and by carbon dioxide from people exhaling and cooking.

An average 80-year-old American has spent 72 of those years indoors (90% of one's life is spent indoors). Indoor air pollution is, on average, three times higher than outdoors and is responsible for roughly five percent of all cancer diagnosis. Within the USA alone, more than 7.5 trillion dollars were spent on building optimizations over the last 30 years with less than 400 million dollars spent on IAQ enhancement. The SARS-CoV-2 (COVID-19) pandemic of 2020 has exemplified the need for treating indoor air quality. Utilization of ionization to treat indoor air quality can lessen the power consumption in buildings by reducing the amount of make-up air required to maintain clean air in commercial and residential spaces. Through the end of the 2020-2030 decade, we will see implementation of building "health dashboards" to monitor overall IAQ. Buildings that do not meet IAQ standards may be subject to excessive energy cost and risk liability. (Source: National Air Filtration Association COVID19 Air Cleaning Keith, Senatore, & Sharp, 2021) the aforementioned reference is incorporated by reference herein in its entirety.

Corona ion generators corona (electrical) and alpha (radioisotope) ionizers, have a positive impact on removing and/or killing "active" airborne particles, including viruses from air. Electrical ionizers can pose a significant problem with maintaining a balance between positive and negative ions, due to an unhealthy level of ozone and particulate contamination caused by eroding emission points. Conversely, alpha ionization does not have these same issues. Further, ionization in concentration has a positive impact on Indoor Air Quality (hereinafter "IAQ") and benefits overall health due to the improved IAQ. Ions influence particulate contamination, volatile organic chemicals, and viruses suspended in air by forming agglomerations or by rapidly oxidizing the particle(s). As agglomerations are formed and the particulate matter increases in size, particulates fall to the floor or other surface (out of a normal breathing zone), are trapped on air filters or cling to oppositely charged surfaces. Harmful contamination caused by bacteria, viruses, volatile organic compounds or other live agents can be destroyed or deactivated through an oxidation process induced by ionization. When two ions stick to the surface of a virus (or live agent) the ions transform into a highly oxidizing OH radicals which draws out the hydrogen from the protein of a virus and then converts the OH radical into water leaving the virus inactive (Oxford, 2021). Similarly, oxidation also impacts odors, VOCs, and bacteria by neutralization or breaking down their molecular structure.

Ions naturally occur in outdoor space and ion density is enhanced when an energy source interacts with an oxygen atom or molecule. Through natural processes such as naturally decaying radioactivity, waterfalls, ocean surf, lightning storms, cosmic rays, and sunlight, ion density is increased as released energy causes a gain or loss of an electron thus forming ions. Ions are considered "nature's" way of cleaning air.

Conversely, ions within indoor environments are depleted through normal household activities such as cooking, heating, cooling, off gassing of building materials and the limited exchanges of ion rich air into the living and working environment. This ion depletion in indoor space leads to multiple health ailments.

Thus, there has been a long-felt need for a method and apparatus for treating air with alpha radioisotope ionization and for controlling the alpha emitter to achieve a desired ionization concentration of anions and cations.

SUMMARY

Ionization of indoor air via the present invention, improves the indoor air quality in at least one of the following ways:

a. VOCs, viruses, and bacteria, are removed through oxidation, neutralization or breaking down their molecular structure;

b. Positive and negative ions surround air particles that include pathogens (e.g., viruses, bacteria, mold spores) the ions pull hydrogen away from the pathogen. In the case of a virus, the hydrogen is pulled away from its protein coat, or capsid. The hydrogen is a key component to the actual structure of the viral protein coat, and without it, the virus cannot infect;

c. Particulate matter gains mass, or agglomerates with other particulates contained within breathing air making it fall out of the normal breathing zone. It is then easily trapped in normal filtration, or it may simply fall to the ground, or can become attached to oppositely charged surfaces thus be removed from the normal breathing space; and, d. The air flow is measured in cubic feet per minute and can thus deliver the proper quantity of ions or ion concentration for a given volume of a desired space.

It should be noted that the aforementioned benefits imparted by the present invention are non-exhaustive.

According to aspects illustrated herein, the present invention may generally include a device for treating air with alpha radioisotope ionization having a primary containment structure of multiple layers of metallization to safely entomb the radioactive material (sealed source), a secondary protective housing, or one or more housings arranged within the holders, one or more alpha emitters arranged within the one or more holders, each of the alpha emitters arranged to emit alpha particles creating ions, including anions and cations, the alpha particles created by a sealed source radioactive isotope encapsulated in the one or more alpha emitters, wherein the sealed source protects the environment from contact with the isotope, and a biasing means for applying a high voltage, low current signal to the one or more alpha emitters, the current signal arranged to regulate the balance of positive and negative ions in response to the desired applications.

In other arrangements, the present invention may include a device for treating air with alpha radioisotope ionization, the device comprising a frame having an internal surface, the internal surface defining an internal space, a pair of internal brackets arranged within the internal space and removably connected to the frame, each internal bracket arranged to have at least one spacer arranged between the respective bracket and the internal surface of the frame, and at least one alpha ionizing apparatus removably connected to the pair of internal brackets.

In other arrangements, the aforementioned at least one alpha ionizing apparatus may comprise a securement bracket including: a pair of channels; and, a cavity; and, a rail arranged to be removably secured within the cavity, the rail including a pair of end caps disposed at opposite ends and a plurality of trays arranged between the pair of end caps, each tray of the plurality of trays includes: a sub-tray having a pair of channels therein and a cavity therein; at least one foil arranged to be seated within the cavity of the sub-tray; and, a grid arranged to be removably seated within the cavity of the sub-tray and secured therein by the pair of channels of the sub-tray.

In some embodiments, the present invention may generally comprise a device for treating air with alpha radioisotope ionization, the device having a housing, one or more alpha emitter apparatuses, each of which having a securement bracket arranged within the housing, each of the alpha emitter apparatuses arranged to emit alpha particles creating ions, including anions and cations, the alpha particles created by a sealed source radioactive isotope encapsulated in the one or more alpha emitter apparatuses, wherein the seal protects the environment from contact with the isotope, and a biasing means for applying a high voltage, low amperage current signal to the one or more alpha emitters, the current signal arranged to regulate the ion concentration of the ions.

In further arrangements, the present invention may comprise a device for treating air with alpha radioisotope ionization, the device including at least one alpha ionizing apparatus having a removable securement bracket, and at least one mounting bracket arranged to removably secure to the securement bracket, wherein the at least one mounting bracket is arranged to be secured to an internal surface of an air passageway.

A primary object of the invention is to arrange a selected radioisotope contained within metallization layers to form a sealed source enclosure such that the radioisotope within the enclosure will emit radiation thereby ionizing particles in the surrounding environment which will treat surrounding air.

A secondary object of the invention is to arrange at least one selected radioisotope within a sealed source enclosure, where the at least one sealed source enclosure is secured within a housing, where the housing is arranged to be fixed within a frame and inserted into the air pathway of an HVAC duct, or similar pathway-treating the surrounding air traveling in the HVAC duct.

An additional object of the invention is to allow for use of electronically connecting a sensor to the radioisotope within the sealed source enclosure, or in proximity to the sealed enclosure, where the sensor is further arranged to measure, calculate, or a combination thereof, the ion concentration in the surrounding air.

A further object of the invention is to communicate a high voltage, low current signal to the at least one alpha emitter, where the signal influences the positivity or negativity of the ion production of the surrounding air created from the radiation of the radioisotope.

A still further object of the invention is for the sensor to communicate the measured ion concentration of the surrounding air and make adjustments to the signal applied to the at least one alpha emitter to change the ion balance of the surrounding air to meet targeted ion polarity levels.

These and other objects, features, and advantages of the present invention will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
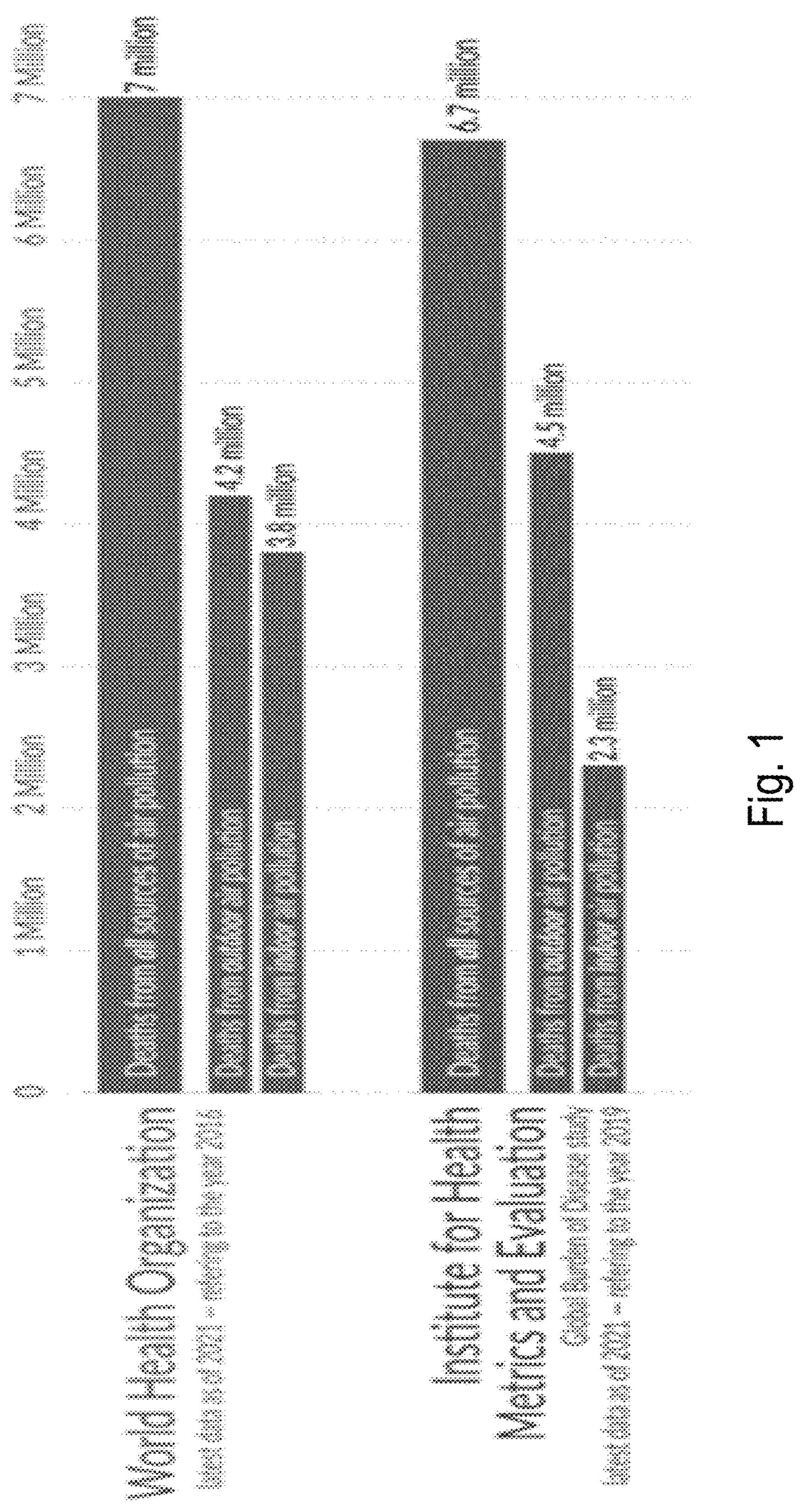
FIG. 1 is a graph which reflects data regarding deaths attributed to air pollution.

At the outset, it should be appreciated that identical drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. As such, those in the art will understand that any suitable material, now known or hereafter developed, may be used in forming the present invention described herein.

It should be noted that the terms "including", "includes", "having", "has", "contains", and/or "containing", should be interpreted as being substantially synonymous with the terms "comprising" and/or "comprises".

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value. Also, the adjectives, "top", "bottom", "right", "left", and their derivatives, in the description herebelow, refer to the perspective of one facing the invention as shown in the figure under discussion.

It should be understood that the use of "or" in the present application is with respect to a "non-exclusive" arrangement unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" or "one of:" is used herein.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Herein, the present invention emits alpha particles which, in turn, will ionize the surrounding air. It should be appreciated that "surrounding" means the atmosphere, environment, objects, and the like, that are in the relative vicinity or proximity to the present invention.

Terminology

The following definitions are to be used in understanding the present invention described herein:

Ionization
- a. Ionization is the process by which ions are formed by gain or loss of an electron from an atom or molecule. If an atom or molecule gains an electron, it becomes negatively charged (an anion), and if it loses an electron, it becomes positively charged (a cation). Energy may be lost or gained in the formation of an ion.

Nuclear Ionization
- a. Ionization achieved through the natural decay of a radioactive isotope. Energy released from the decay process causes ion formation.

Ionization Radiation
- a. Ionizing radiation, including nuclear radiation, consists of subatomic particles or electromagnetic waves that have sufficient energy to ionize atoms or molecules by detaching electrons from them. The particles travel at high rates of speed and the electromagnetic waves are on the high-energy portion of the electromagnetic spectrum.

Alpha Particle
- a. Alpha particles consist of two protons and two neutrons bound together into a particle identical to a helium nucleus. Alpha particle emissions are generally produced in the process of alpha decay.
- b. Alpha particles are a strongly ionizing form of radiation, but when emitted by radioactive decay they have low penetration power and can be absorbed by a few centimeters of air.

Alpha Emitter
- a. A sealed source radioactive isotope (e.g., Polonium, Americium, Krypton, etc.) encapsulated in a secondary holder. The alpha emitter safely emits alpha particles creating ions. The source is sealed through the metalizing process and protects the environment from contact with the isotope. See References, infra.

Technology Box
- a. An orientation of singular or multiple alpha emitters mounted in a configuration that is available for installation in an air handling or HVAC system. The mounted alpha emitters produce voluminous ions that are introduced into the air stream to improve Indoor Air Quality, or for treating air in a ventilation stack prior to environment discharge, or other contained spaces that require treatment of air.
- b. Alpha emitters safely produce ions through natural decay of the radioisotope in the sealed source.

Sealed Source
- a. Proprietary process where a radioisotope is safely encased through a metalizing process, i.e., the radioisotope is contained within a metallic material.

Activity level
- a. Amount of energy generating activity available in a sealed source usually measured in millicurie or microcurie.

Secondary Housing
- a. Mounting device designed to safely contain a sealed source.

Bias Voltage
- a. High voltage low current applied to alpha emitting devices that influences ion balance density.

System a. Alpha emitters supported in a mounting box, frame, or housing, with a biasing ability, is arranged to be installed in an air movement system, e.g., an HVAC duct system, an air purification system, where individual alpha emitters are contained in a housing and the housing is arranged to be installed in air ducts, exhaust ducts, fume hoods and any other air movement system.

Ion Density Concentration a. Concentration of ions measured per cubic centimeter. Measurements are referenced as anion (negative ions), cation (positive ions), or total ions (anion plus cation).

Air Ions a. Air ions are electrically charged molecules or atoms in the atmosphere. An air ion is formed when a gaseous molecule or atom receives sufficiently high energy to eject an electron. Negative ions are those that gain an electron, positive ions are those who lose an electron.

b. Substantially all positive natural ions during fair weather come from radioactivity. Approximately 40% of these natural air ions come from radioactive minerals in the ground. Each time a radioactive alpha isotope decays it ejects an energetic alpha particle which interacts with oxygen and nitrogen and other gases that form air. A single alpha particle can produce hundreds of thousands of air ion pairs as it travels a few cm through the air.

Heating Ventilation Air Conditioning a. Heating, Ventilation and Air-Conditioning (HVAC) systems are to help maintain good indoor air quality through adequate ventilation with filtration and provide thermal comfort.

Indoor Air Quality a. Indoor Air Quality (IAQ) refers to the air quality within and around buildings and structures, especially as it relates to the health and comfort of building occupants. Understanding and controlling common pollutants indoors can help reduce your risk of indoor health concerns.

Biological Agents a. Biological agents include bacteria, viruses, fungi, other microorganisms and their associated toxins. They have the ability to adversely affect human health in a variety of ways, ranging from relatively mild, allergic reactions to serious medical conditions—even death. Some organisms, including various types of mold and *Legionella* bacteria, are found readily in the natural and built environment. Many are capable of spreading from person to person (e.g., bloodborne pathogens and influenza viruses), either directly or indirectly; some, such as Zika virus, are transmitted by insect vectors.

Select Biological Agents a. Select biological agents are biological agents and toxins that have been determined to have the potential to pose a severe threat to public health and safety, to animal and plant health, or to animal or plant products. In some forms, biological "select agents", or "select biological agents" can also be weaponized for use in bioterrorism or other crimes.

Particulate Matter (PM). See, FIG. 2, Infra.

a. Particulate matter (also called particle pollution): the term for a mixture of solid particles and liquid droplets found in the air. Some particles, such as dust, dirt, soot, or smoke, are large or dark enough to be seen with the naked eye. Others are so small they can only be detected using an electron microscope.

b. Particulate Matter comes in many sizes and shapes and can be made up of hundreds of different chemicals. Some are emitted directly from a source, such as construction sites, unpaved roads, fields, smokestacks or fires. Most particles form in the atmosphere as a result of complex reactions of chemicals such as sulfur dioxide and nitrogen oxides, which are pollutants emitted from power plants, industries and automobiles.

Agglomeration a. The act or process of collecting in a mass. Heaping or bonding together. Agglomeration by ionization is micro particles sticking together to form larger particles due to influence of positive and negative charges. As a particle becomes larger, their mass increases and they are less likely to suspend in the breathing zone. Further, larger particles are easier to capture in mechanical filtration systems which may be paired with the present invention.

Air Filtration a. Air filtration is the technology used most widely to remove particles from an air stream due to its relative ease and flexibility. Both fabric and fibrous filters are used for airborne particle control. Fabric filters are made from woven and felted fabrics that collect particles primarily on their surface.

Air Filter Ratings a. Filters generally have MERV Ratings (Minimum Efficiency Rating Values) with a range of 1-16. The higher the number the greater the filters ability to capture smaller particles. Beyond MERV filters is HEPA (High Efficiency Particulate Air). The HEPA air filter can theoretically remove at least 99.97% of dust, pollen, mold, bacteria, and any airborne particles with a size of 0.3 microns (μm) or larger. Agglomeration by ionization increases particle size making it easier for the filter to capture.

Makeup Air a. Makeup air is outside air that replaces air exhausted from inside the building, home or other space. In most houses, there are several appliances that push or pull air out of the house, including clothes dryers, bathroom fans, fireplaces and kitchen range hoods.

Relative Humidity a. Relative Humidity is a measure of water vapor content of air normally expressed as percentage (%).

Cubic Feet Per Minute (CFM)

a. Cubic Feet Per Minute (CFM) is a measurement of airflow volume, determined by how many cubic feet of air pass by a stationary point in one minute.

Ozone a. Highly reactive gas composed of three oxygen atoms. In concentration, ozone can have adverse health effects.

Underwriters Laboratories (UL)

a. Defines allowable limits of Ozone present in air:

1. UL 867—Less than fifty (50) PPB (Electrostatic Air Cleaners)
2. UL 2998—Less than five (5) PPB (Indoor Air Purification System)

Volatile Organic Compounds (VOCs)

a. Volatile Organic Compounds (VOCs) are a large group of chemicals that are found in many products that are used to build and maintain homes and commercial spaces. Once these chemicals are in buildings, they release gases into the breathing zones of indoor spaces.

DESCRIPTION

Generally, the present invention relates to an alpha ionizer, which is configured to use a low-level alpha particle radiation source with a short-range in the air approximately between 3 cm-25 cm. The short range makes the alpha ionizers safe to use by personnel while still providing high ion output.

Airborne alpha particles, which are emitted from an alpha ionizer, typically travel only a few inches from the emitting source and have little penetrating power. Alpha particles are generally not considered an external radiation hazard because the dead layer of skin of a person stops alpha particulars from penetrating through the skin. The only way alpha particles can be harmful is by ingestion or inhalation of an alpha emitter (internal exposure). Internally, the source of alpha radiation can be in close contact with unprotected body tissue and can deposit a large amount of energy in a small volume of body tissue.

The alpha ionizer of the present invention, described herein, may comprise a polonium-210 core, or source (hereinafter "Po-210"). Po-210 is a product of the radioactive decay of natural uranium-238 (hereinafter "U-238"). U-238 found in the earth's crust. Po-210 decays to a stable form of lead (hereinafter "Pb-206") by emitting alpha particles. A very small percentage of the time (0.0012%), 803 keV gamma rays are also generated in this decay.

It should be noted that Po-210 is merely an exemplary material choice of the alpha ionizer of the present invention, such that alternatives, e.g., Americium, Krypton, etc., within the scope of the present invention, are contemplated in the scope of the appending claims.

The small amount of 803 keV gamma radiation produced in the decay process of Po-210 is further attenuated by the present invention with the inclusion of a metallic foil encapsulation structure, in concert with a frame of the alpha ionizer of the present invention. In a preferred embodiment, the frame is constructed of steel, however, in alternative embodiments, the frame may be constructed of other metals which may have attenuation properties of gamma radiation.

The present invention integrates alpha emitters, which comprise sealed source radioactive isotopes into a mechanism that utilizes flowing air, such as HVAC ducting or the like. Alpha particles are generated naturally through the process of radioisotope decay. Alpha particles generated from the alpha emitter contain two neutrons with no charge and two positively charged protons, traveling at very high speed. When alpha particles strip electrons from atoms or molecules, they create ions.

Biasing herein is a function of the present invention that allows a high voltage, low current signal to be applied to the alpha emitter(s) thereby affecting the ion balance or ion density, introducing variability to the ion balance or ion density in order to achieve a predetermined target ion concentration based on the needs of the end user or customers' demands.

The alpha emitters are arranged within holders, and, in the present invention, the alpha emitters are fixedly secured to the holders. The holders are arranged within the housing, and, in the present invention, the housing generally spans and takes the shape of a cross-section of the mechanism that utilizes air flow.

Ingressing air, that is, incoming air, is air located upstream from the present invention, where the air is relative to the air flow direction such that the air has yet to receive ionization. Egressing air, that is, outgoing air, is air located downstream from the present invention, where the air is relative to the air flow direction such that the air has received ionization from the present invention.

FIGURES

Adverting now to the figures, FIG. 1 illustrates a graph providing quantities of death from: all sources of air pollution; outdoor air pollution; and, indoor air pollution, gathered from the WHO (World Health Organization) from 2016 (the latest dataset available as of 2021) and from the IHME (Institute for Health Metrics and Evaluation) from 2019 (the latest dataset available as of 2021). It should be appreciated that the deaths attributed to indoor air pollution is over 2.3 million.

Figure 2:
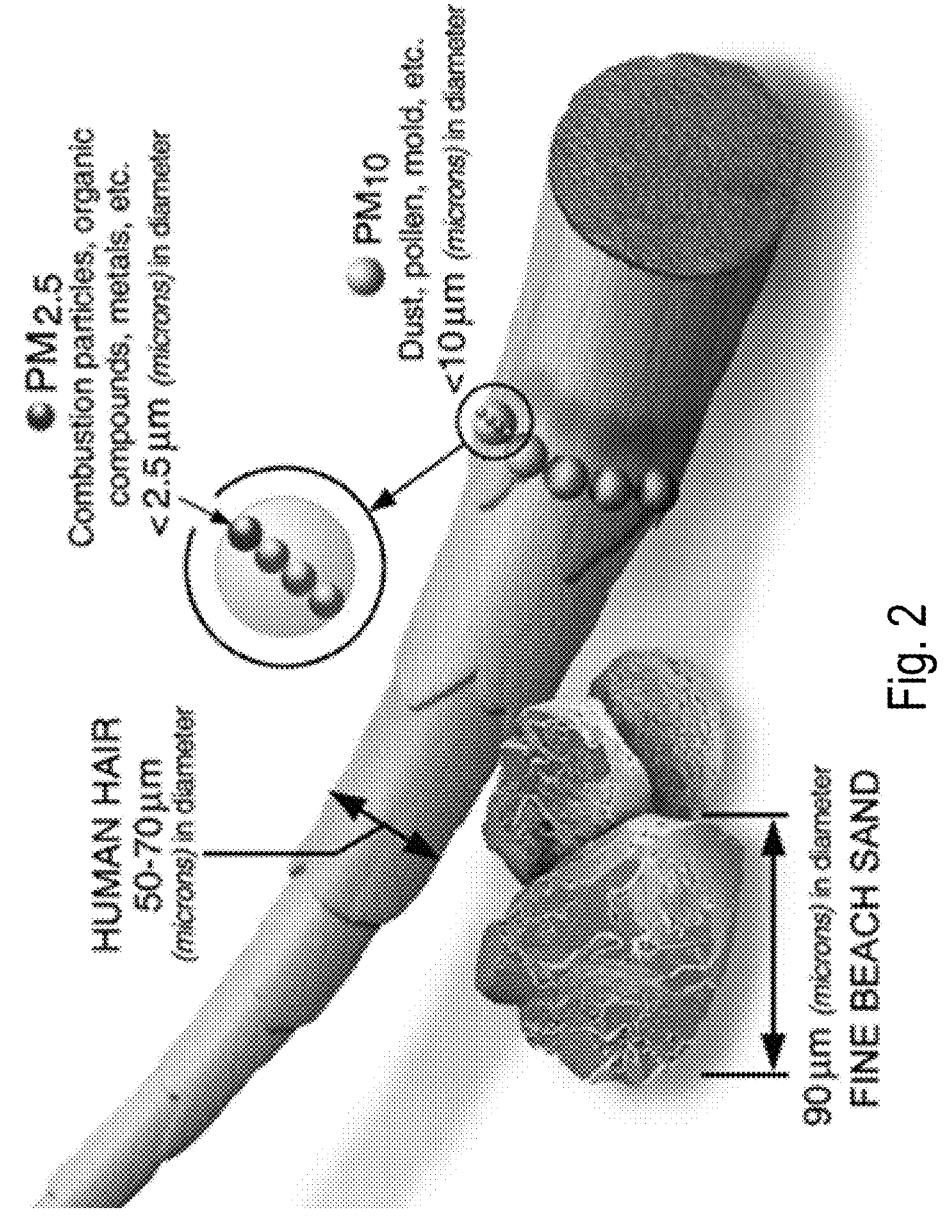
FIG. 2 illustrates various particulates compared to common items.
Figure 3A:
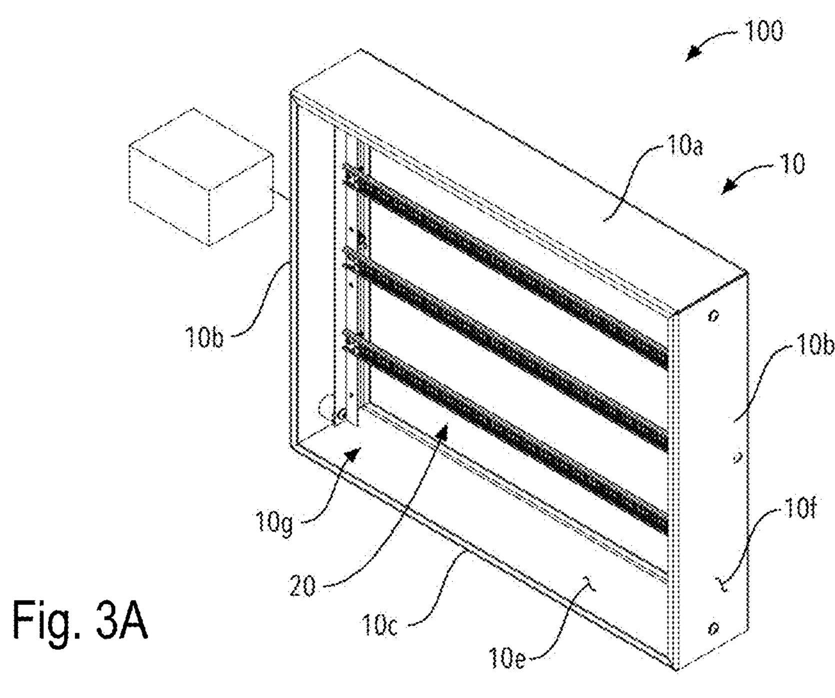
FIG. 3A is a perspective view of the present invention.
Figure 3B:
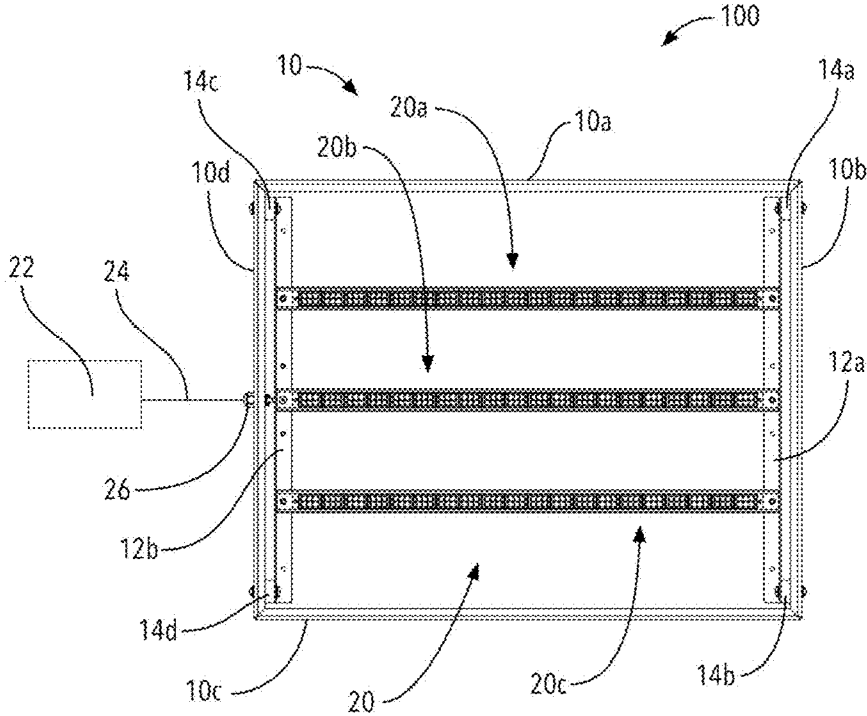
FIG. 3B is a front view of the invention shown in FIG. 3A.
Figure 4:
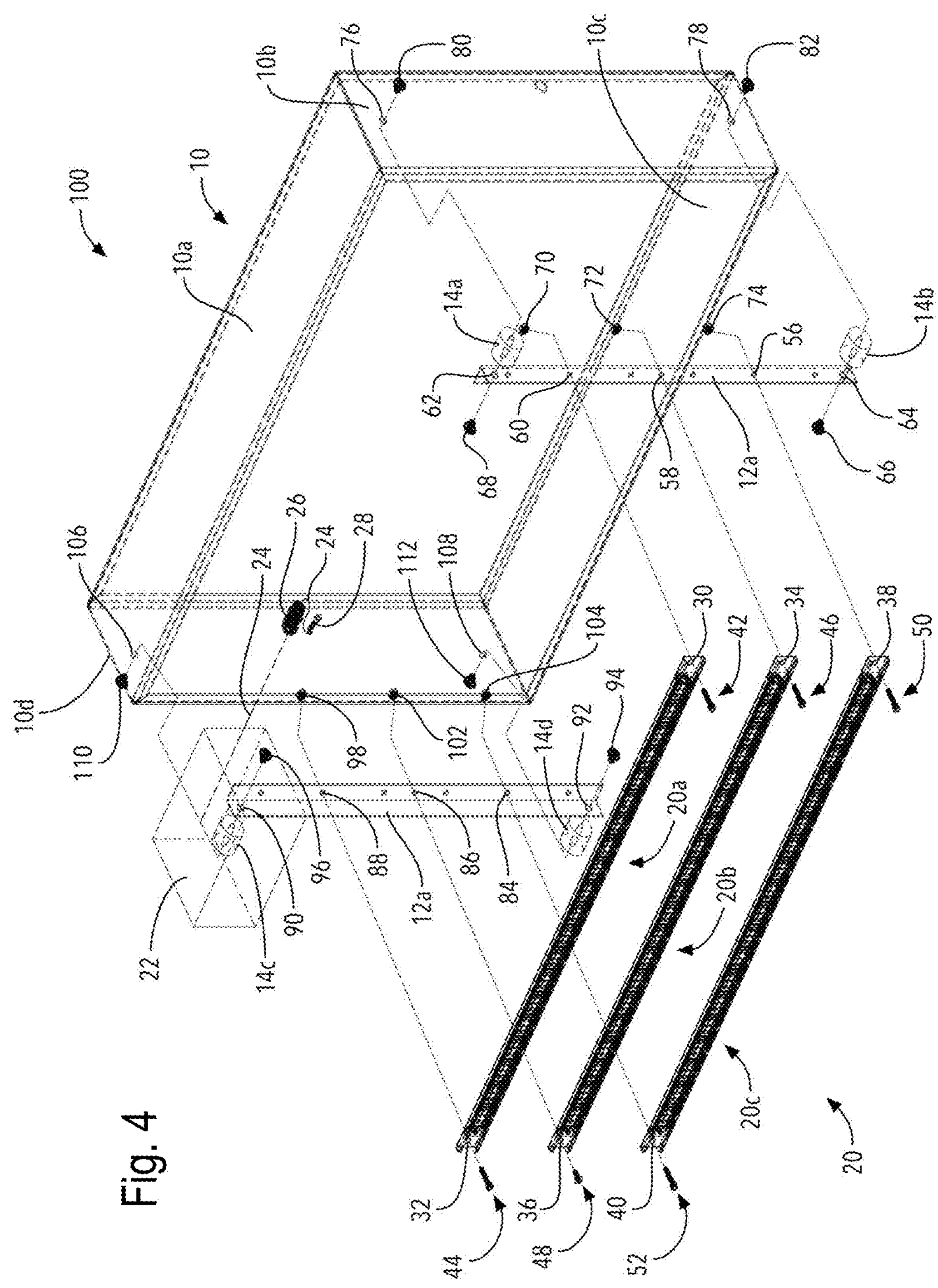
FIG. 4 is an exploded view of the invention shown in FIG. 3A.

FIG. 2 illustrates various particulates compared to common items. For example, fine beach sand is approximately 90 μm (microns) in diameter, human hair is approximately 50-70 μm (microns) in diameter, items like dust, pollen, mold, i.e., Particulate Matter ($PM_{10}$), and the like, are approximately less than 10 μm (microns) in diameter; and, combustion particles, organic compounds, metals, and the like, i.e., $PM_{2.5}$, are approximately less than 2.5 μm (microns) in diameter. It should be appreciated that known in the art mechanical filtration systems for indoor air may not be able to effectively filter the aforementioned particles, unlike the present invention's ionization of the surrounding air.

The following description should be taken in view of FIGS. 3A through 5B which generally illustrate a perspective view of the present invention, an exploded view of the present invention, an isolated perspective view of one embodiment of an alpha emitter apparatus of the present invention, and a section thereof, respectively.

The present invention generally is arranged as a "technology box", or ionizing apparatus 100, which at least comprises frame 10, plurality of alpha emitter apparatuses 20, and bias box 22. Frame 10, or "housing", generally comprises members 10*a*-10*d* which are interconnected, i.e., a substantially rectangular shape having two vertical members (10*a* and 10*c*) joined to two horizontal members (10*b* and 10*d*). Frame 10 includes internal surface 10*e* and external surface 10*f*. Internal surface 10*e* defines internal space 10*g* of frame 10 (or of members 10*a*-10*d*). Plurality of alpha emitter apparatuses 20 includes first alpha emitter apparatus 20*a*, second alpha emitter apparatus 20*b*, and third alpha emitter apparatus 20*c*. Each alpha emitter apparatus of plurality of alpha emitter apparatuses 20 is mounted to frame 10 via internal brackets 12*a* and 12*b*. Preferably, each alpha emitter apparatus of plurality of alpha emitter apparatuses 20 is mounted to internal brackets 12*a* and 12*b* in a removable manner, e.g., fasteners such as screws, nuts and bolts, snap-fit, etc., described further, infra. In some embodiments, spacers 14*a*-14*d* are arranged between internal brackets 12*a* and 12*b* and frame 10. In some arrangements, ionizing apparatus 100 may further include biasing box 22, which includes output line 24 extending therefrom and terminated by output connector 26. Output connector 26 is either fixedly or removably engaged to one of the members of frame 10 and is further arranged to having contact end which is arranged to engage (i.e., abut, or touch) one of internal brackets 12*a* and 12*b*.

In some embodiments, to assemble ionizing apparatus 100, bracket 12*a* is secured to member 10*b* via spacers 14*a* and 14*b*. Spacers 14*a* and 14*b* each have two partial through-bores disposed at opposite ends, i.e., the respective partial through-bores are isolated within the respective spacers. Fastener 80 engages aperture 76 of member 10*b* and then secures to one of the through-bores of spacer 14*a*. Aperture 62 of bracket 12*a* accepts fastener 68 therein and fastener 68 engages the other through-bore spacer 14*a*. Fastener 82 engages aperture 78 of member 10*b* and then secures to one of the through-bores of spacer 14*b*. Aperture 64 of bracket 12*a* accepts fastener 66 therein and fastener 66 engages the other through-bore spacer 14*b*. Fastener 110 engages aperture 106 of member 10*d* and then secures to one of the through-bores of spacer 14*c*. Aperture 90 of bracket 12*b* accepts fastener 96 therein and fastener 96 engages the other through-bore spacer 14*c*. Fastener 112 engages aperture 108 of member 10*d* and then secures to one of the through-bores of spacer 14*d*. Aperture 92 of bracket 12*b* accepts fastener 94 therein and fastener 94 engages the other through-bore spacer 14*d*.

Brackets 14*a* and 14*b* are preferably arranged to removably hold first alpha emitter apparatus 20*a*, second alpha emitter apparatus 20*b*, and third alpha emitter apparatus 20*c* thereon. In some embodiments, first alpha emitter apparatus 20*a* includes two mounting apertures 30 and 32 arranged proximate opposite ends. Mounting apertures 30 and 32 are arranged to accept fasteners 42 and 44, respectively, whereas fasteners 42 and 44 engage apertures 60 and 88 of brackets 14*a* and 14*b* respectively. Fasteners 42 and 44 are thereby removably secured within apertures 60 and 88 via nuts 70 and 98. Second alpha emitter apparatus 20*b* includes two mounting apertures 34 and 36 arranged proximate opposite ends. Mounting apertures 34 and 36 are arranged to accept fasteners 46 and 48, respectively, whereas fasteners 46 and 48 engage apertures 58 and 86 of brackets 14*a* and 14*b* respectively. Fasteners 46 and 48 are thereby removably secured within apertures 58 and 86 via nuts 72 and 102. Third alpha emitter apparatus 20*c* includes two mounting apertures 38 and 40 arranged proximate opposite ends. Mounting apertures 38 and 40 are arranged to accept fasteners 50 and 52, respectively, whereas fasteners 50 and 52 engage apertures 56 and 84 of brackets 14*a* and 14*b* respectively. Fasteners 50 and 52 are thereby removably secured within apertures 56 and 84 via nuts 74 and 104.

In a preferred embodiment, output connector 26 is arranged to be inserted in one of members 10*b* and 10*d*, either removably, e.g., threaded through a through-bore, or fixedly inserted within one of the members of frame 10, such that contact end 28 is disposed within members 10*a*-10*d*. Contact end 28 is in electrical communication with bias box 22 via output line 24. Additionally, contact end 28 of output connector 26 is arranged to contact, removably engage, or at least abut at least one of: fasteners 42, 44, 46, 48, 50, 52, brackets 12*a* and 12*b*, nuts 70, 72, 74, 98, 102, and 104—as the aforementioned components are all preferably constructed of any material that is a conductive material. Inversely and in a preferred embodiment, spacers 14*a*-14*d* are constructed of any material that is not a conductive material, i.e., a material that is an insulator.

In a preferred embodiment, first alpha emitter apparatus 20*a*, second alpha emitter apparatus 20*b*, and third alpha emitter apparatus 20*c*, and their respective components, discussed further infra, are entirely composed of a conductive material or materials.

As such, voltage that is applied by bias box 22 is communicated to contact end 28, thereby electrifying first alpha emitter apparatus 20*a*, second alpha emitter apparatus 20*b*, and third alpha emitter apparatus 20*c* by way of their respective contact with brackets 12*a* and 12*b*. Spacers 14*a*-14*d*, being constructed of an insulating material, prevent frame 10 from being electrified by contact end 28.

In other words, bias box 22, is in electrical communication with each of the alpha emitter apparatuses. The bias box may take any configuration that is able to provide a high voltage, low amperage current signal to all, or any combination of the alpha emitter apparatuses. The current signal, when applied to the alpha emitter apparatuses influences the type of ions that are emitted therefrom, i.e., anions or cations. It should be noted that spacers 14*a*-14*d* are a plurality of isolators, i.e., they are arranged to provide a separation from frame 10 and brackets 12*a*-12*b* and/or the alpha emitter apparatuses, to isolate an electrical current applied thereto. As such, bias box 22 may have a plurality of manual inputs, power inputs, and a wired connection means in communication with the alpha emitter apparatuses of the present invention to apply the signal current thereto. In some embodiments, bias box 22 may include means for receiving a remote signal for activation, e.g., a receiver or transceiver.

Figures 5A, 5B:
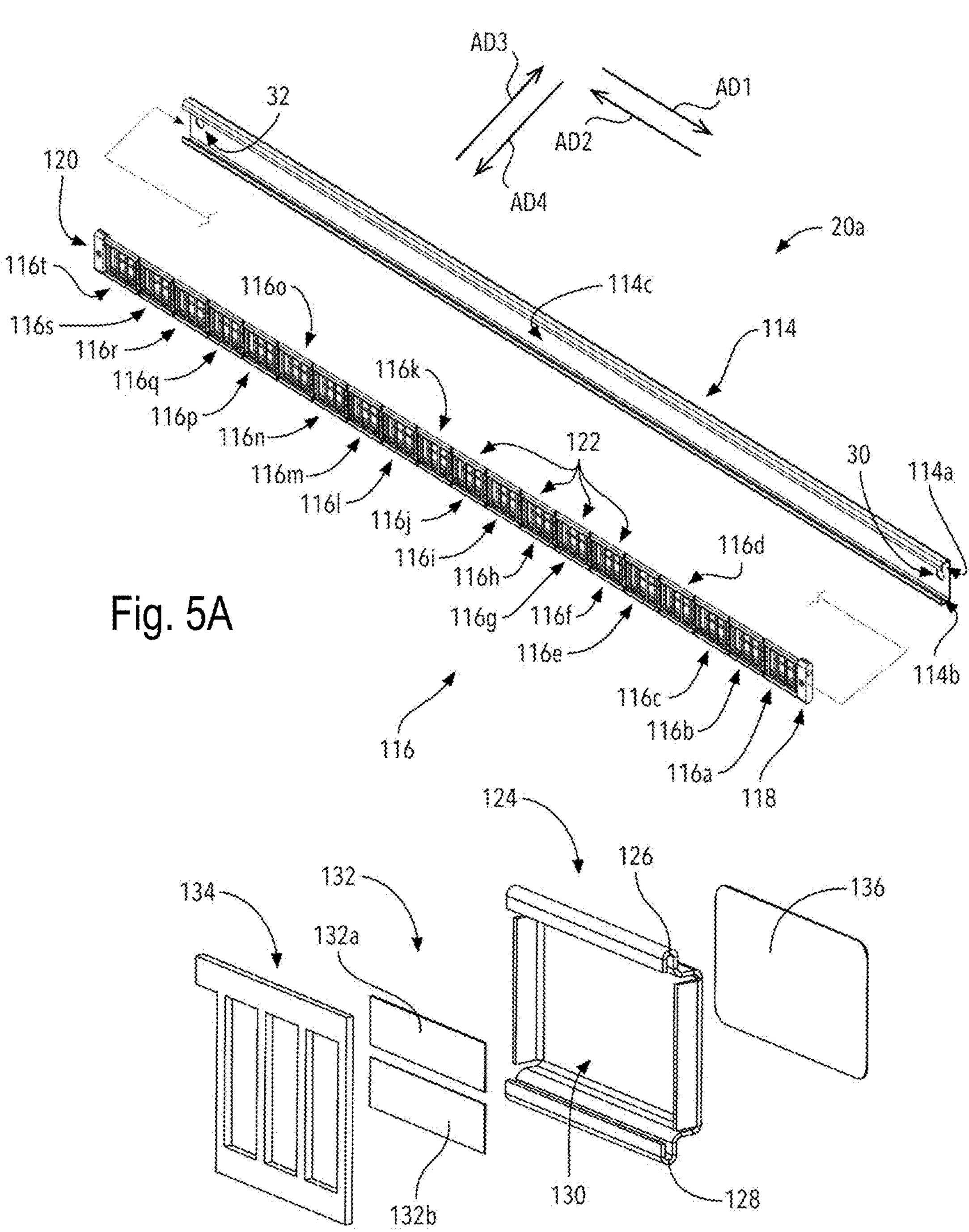
FIG. 5A is a perspective view of an alpha emitter apparatus of the present invention.
FIG. 5B illustrates a portion of the alpha emitter apparatus shown in FIG. 5A.

First alpha emitter apparatus 20*a* is shown in a semi-exploded view in FIG. 5A. It should be noted that the following description of first alpha emitter apparatus 20*a* applies to each alpha emitter apparatus of plurality of alpha emitter apparatuses 20.

In some embodiments, first alpha emitter apparatus 20*a* generally comprises securement bracket 114 and rail 116, whereas rail 116 is arranged to be slideably (in either of axial directions AD1 and AD2), or at least removably engaged to or within securement bracket 114. Preferably, rail 116 is substantially contained within cavity 114*c* of securement bracket 114 via channels 114*a* and 114*b*, which prevent rail 116 from being disengaged from cavity 114*c* of securement bracket 114 in axial direction AD4. When fasteners 42 and 44 are engagement to apertures 30 and 32 of securement bracket 114 of first alpha emitter apparatus 20*a*, fasteners 42 and 44 prevent rail 116 from being slideably disengaged from cavity 114*c* of securement bracket 114 in axial directions AD1 and AD2, i.e., fasteners 42 and 44 create a removable stop at the respective ends of securement bracket 114.

Rail 116 generally comprises at least one tray and one or more foils or ionization material 132*a* and 132*b*. Rail 116 may further comprise at least one grid 134, and one or more end caps 118 and 120. In a preferred embodiment, rail 116 includes plurality of trays 122. As shown in FIG. 5A, the exemplary embodiment of rail 116 includes twenty (20) trays of plurality of trays 122. As such, it should be noted that the quantity of trays comprising plurality of trays 122 can vary based on the distance rail 116 needs to span, i.e., the length between the respective ends of securement bracket 114, and a specific quantity of trays should not be considered restrictive on the scope of the appending claims.

Tray 124 (or sub-tray) is one tray of plurality of trays 122, and the following description applies to all of the trays of plurality of trays 122. In some arrangements, tray 124 comprises cavity 130, channel 126, and channel 128. One or more foils 132*a* and 132*b* are arranged in cavity 130. Foils 132*a* and 132*b* may comprise an ionization material, for example Polonium-210. In some examples, the ionization material is Americium. In some examples, the ionization material is krypton. In some embodiments, the ionization material is an X-ray generator or similar high energy particle source that is non-radioactive. The ionization material may be any material suitable for generating ions. Grid 134 is operatively arranged to engage tray 124, specifically channels 126 and 128, to maintain foils 132*a* and 132*b* within cavity 130. At the same time, grid 134 allows ions emitted from foils 132*a* and 132*b* to travel away from the respective foils and additionally creates a barrier from an outwardly facing surface of the foils. Foils 132*a* and/or 132*b* are arranged in cavity 130, and grid 134 is subsequently slid into channels 126 and 128. Tray 124 comprises conductive material or metal, for example, stainless steel. In some embodiments, grid 134 comprises a conductive material or metal, for example, stainless steel. In some embodiments, grid 134 comprises a non-conductive material, for example, a plastic. Rail 116 may further comprise label 136. Label 136 may be connected to tray 124 on a side opposite the side of cavity 130. Label 136 may indicate information about the alpha ion emitting material and/or first alpha emitter apparatus 20*a*. Alternatively, label 136 may be arranged on securement bracket 114 on a surface arranged opposite of cavity 114*c*.

As shown in FIG. 5A, rail 116 may comprise a plurality of sections, for example twenty sections 116*a*-116*t*. Each of sections 116*a*-116*t* include tray 124, one or more foils 132*a*-132*b*, and grid 134. Each of sections 116*a*-116*t* may further comprise label 136. Sections 116*a*-116*t* are inserted into cavity 114*c* and enclosed therein by end caps 118 and 120, as discussed supra. Specifically, tray 124 is arranged to engage channels 114*a* and 114*b* of securement bracket 114. In other arrangement, end caps 118 and 120 may be connected to securement bracket 114 using any means suitable to maintain sections 116*a*-116*t* within securement bracket 114, for example, bolts, screws, rivets, solder, welding, adhesives, etc., or alternatively may be secured within securement bracket 114 in the manner described supra.

Rail 116 is operatively arranged to be electrically connected to bias box 22, via output connector 26 and contact end 28. Specifically, once rail 100 is electrically energized, foils 132*a* and 132*b* will produce either anions or cations depending on the selection of the current delivered from bias box 22. This may be accomplished by electrically connecting bias box 22 to brackets 14*a* and/or 14*b* (directly or indirectly), which is electrically connected to securement bracket 114 and plurality of trays 122 (i.e., brackets 14*a*-14*b*, bracket 114, and plurality of trays 122 all comprise a conductive material such as, for example, stainless steel or other like metal or other conductive material). Alternatively, this may be accomplished by electrically connecting bias box 22 to rail 116 and/or securement bracket 114 (i.e., a wire, contact end 28, or other conductor connects bias box 22 to end cap 118 or 120, electrically conductive securement bracket 114, or electrically conductive tray 124).

Figure 6:
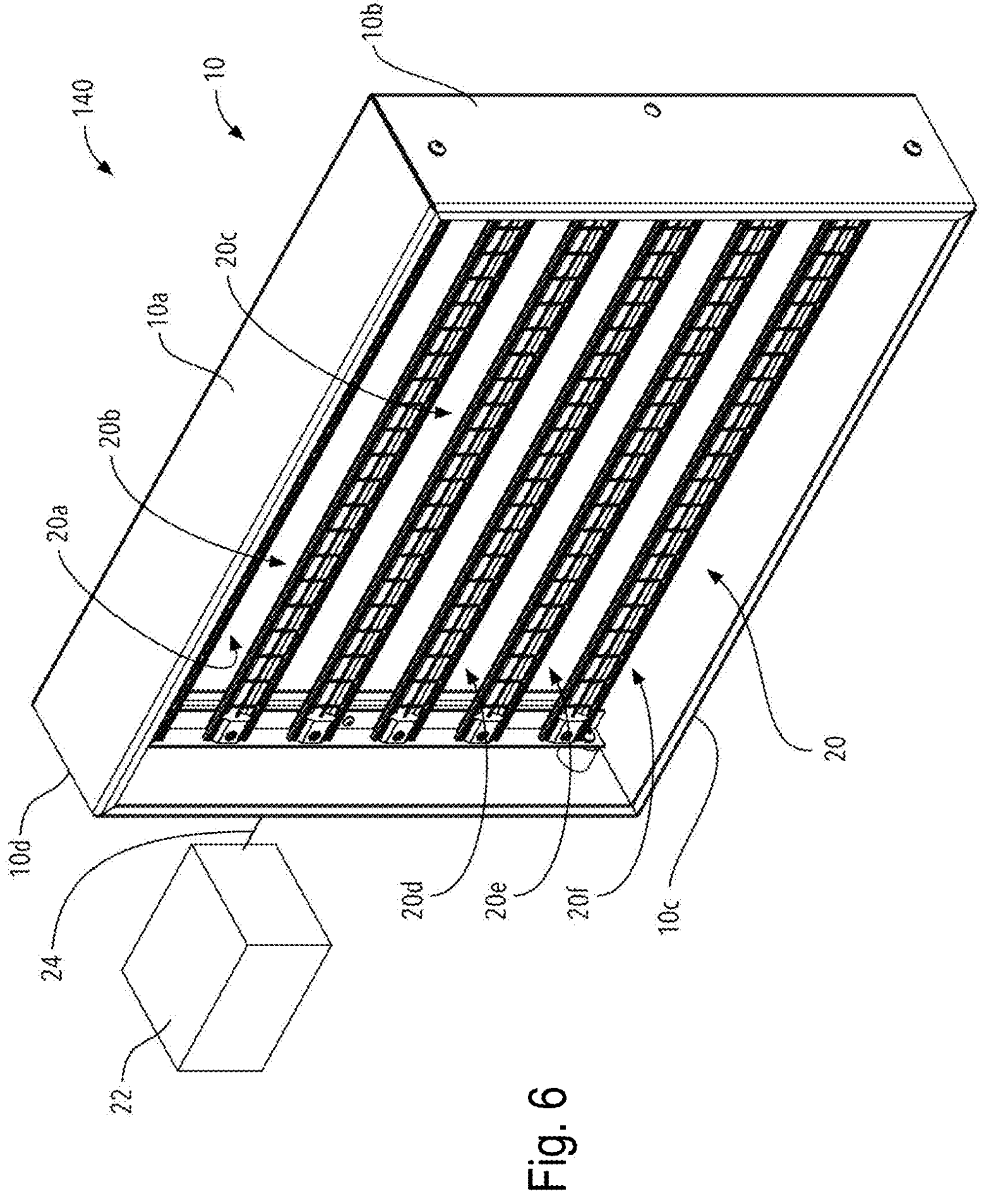
FIG. 6 illustrates an alternative embodiment of the invention shown in FIG. 3A.

The following description should be taken in view of the aforementioned figures and FIG. 6. FIG. 6 generally illustrates an alternative embodiment of ionizing apparatus 110, ionizing apparatus 140. Ionizing apparatus 140 includes all of the components of ionizing apparatus 110, however, plurality of plurality of alpha emitter apparatuses 20 includes first alpha emitter apparatus 20*a*, second alpha emitter apparatus 20*b*, third alpha emitter apparatus 20*c*, fourth alpha emitter apparatus 20*d*, fifth alpha emitter apparatus 20*e*, and sixth alpha emitter apparatus 20*f*.

Figures 7A, 7B:
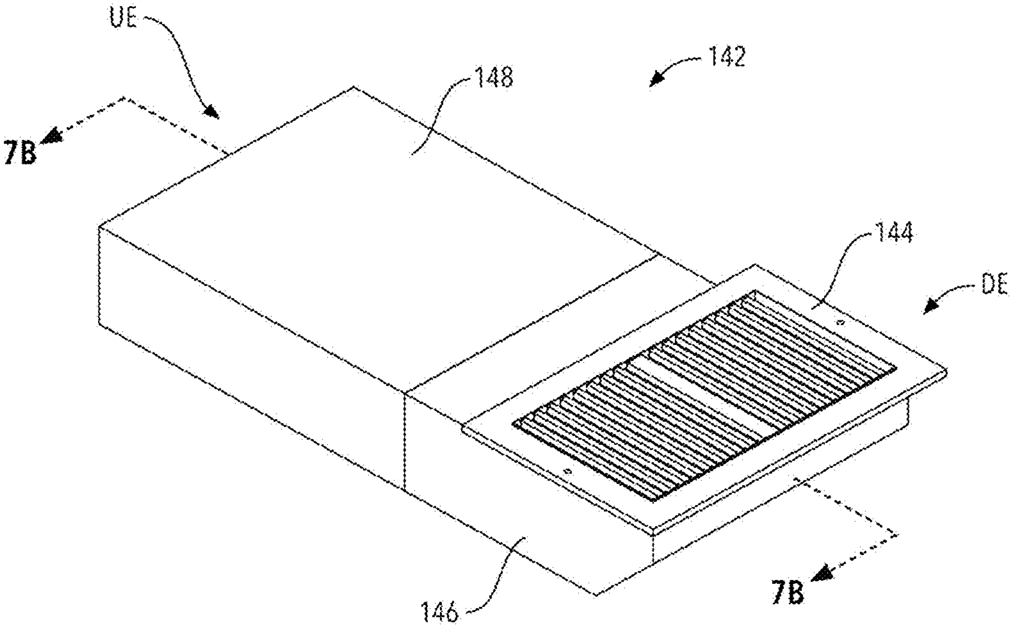
FIG. 7A illustrates an air pathway having an embodiment of the alpha emitter shown in FIG. 5 therein.
FIG. 7B illustrates a cross-sectional view taken generally along line 7B-7B in FIG. 7A.

The following description should be taken in view of the aforementioned figures and FIGS. 7A and 7B, which generally illustrate duct portion with ionizing apparatus 142 and a cross-sectional view of the same, respectively. Duct portion with ionizing apparatus 142 generally includes duct section 148, exhaust section 146 and register 144 arranged at an end of exhaust section 146. First alpha emitter apparatus 20*a* is removably secured within exhaust section 148 (via at least one mounting bracket secured to an internal surface of at least one of: duct section 148; and, exhaust section 146), particularly within air passageway 150 proximate downstream end DE, whereas upstream end UE is proximate a distal end (in relation to exhaust section 146) of duct section 148. It should be noted that multiple alpha emitter apparatuses may be removably secured within exhaust section 146, or alternatively may be arranged within duct section 148. In alternative embodiments, duct portion with ionizing apparatus 142 may also include bias box 22, output line 24, output connector 26 (arranged within a wall of one of: duct section 148; and, exhaust section 146), such that contact end 28 may be connected to first alpha emitter apparatus 20*a*. The alpha emitter apparatus, or alpha emitter apparatuses of present invention are arranged distally in relation to the register, such that air passing from the duct to and out from the register, will be ionized by the alpha emitter arranged within the duct. It should be noted that in some embodiments of duct portion with ionizing apparatus 142, there may be a non-conductive spacer arranged between the at least one mounting bracket and/or at least one internal bracket and/or a pair of internal brackets, such that duct section 142 will not conduct electricity provided by bias box 22.

Figures 8A, 8B:
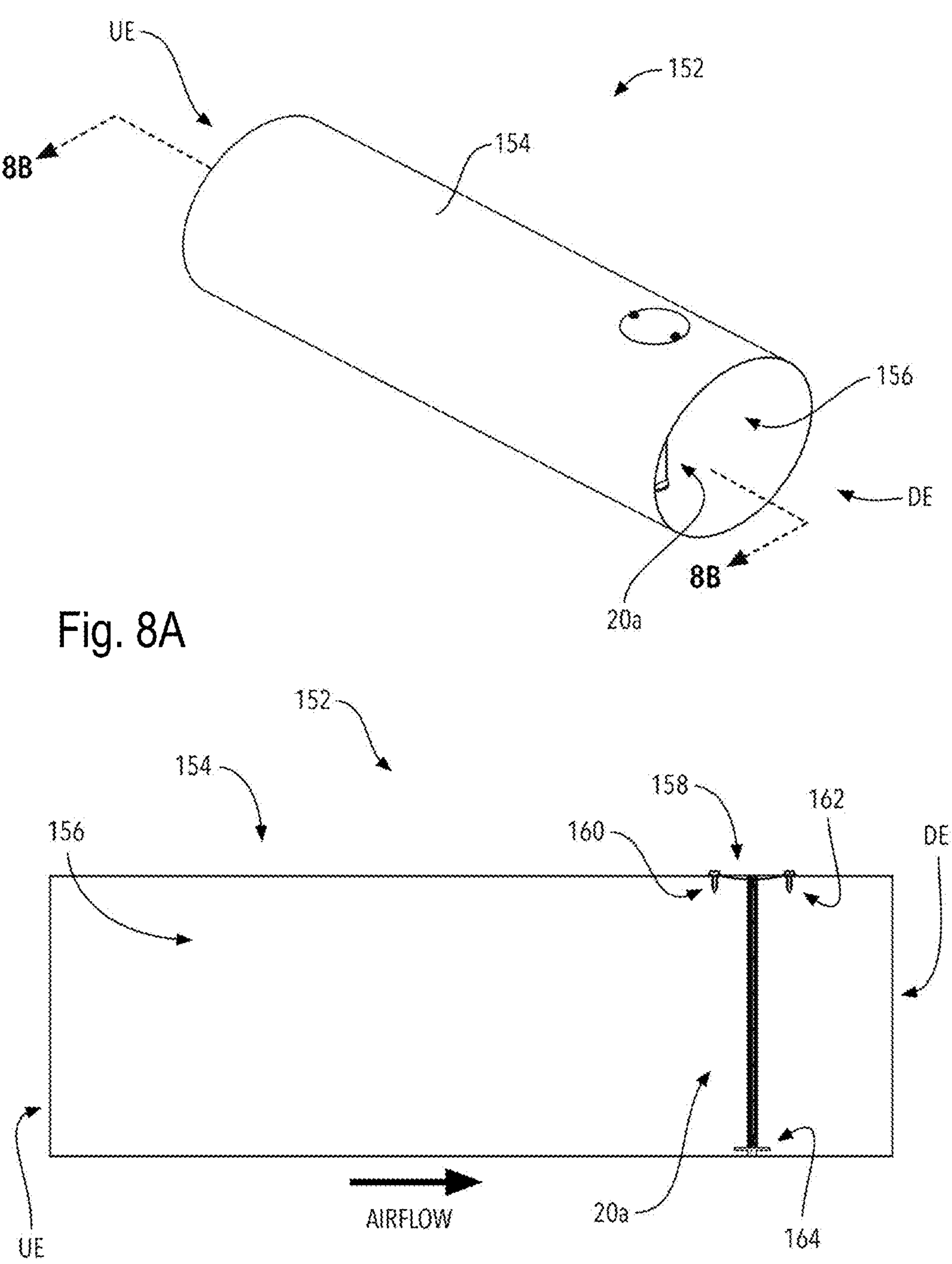
FIG. 8A generally illustrates an alternative embodiment of an air pathway having an embodiment of the alpha emitter shown in FIG. 5 therein; and, FIG. 8B illustrates a cross-sectional view taken generally along line 8B-8B in FIG. 8A.

The following description should be taken in view of the aforementioned figures and FIGS. 8A and 8B, which generally illustrate duct portion with ionizing apparatus 152 and a cross-sectional view of the same, respectively. Duct portion with ionizing apparatus 152 generally includes duct section 154 having air passageway 156 therein and is substantially cylindrical. First alpha emitter apparatus 20*a* is removably secured within duct section 154, particularly within air passageway 156 proximate downstream end DE, whereas upstream end UE is proximate an opposite end of duct section 154. In some embodiments, first alpha emitter apparatus 20*a* is removably secured to duct section 154 via bracket 158 (i.e., mounting bracket) having fasteners 160 and 162, whereas the opposite end of first alpha emitter apparatus 20*a* is at least partially seated, removably connected, or frictionally secured, to internal bracket 164, or internal holder. Preferably, internal bracket 164 is removably secured to an internal surface of duct section 154. It should be noted that multiple alpha emitter apparatuses may be removably secured within duct section 154. In alternative embodiments, duct portion with ionizing apparatus 152 may also include bias box 22, output line 24, output connector 26 (arranged within a wall of duct section 154), such that contact end 28 may be connected to first alpha emitter apparatus 20*a*. The alpha emitter apparatus, or alpha emitter apparatuses of present invention are arranged within the duct, such that air passing from the duct, from upstream end UE to downstream end DE, will be ionized by the alpha emitter arranged within the duct. It should be noted that in some embodiments of duct portion with ionizing apparatus 152, there may be a non-conductive spacer arranged between the mounting bracket and/or the internal bracket, such that duct section 154 will not conduct electricity provided by bias box 22.

The present invention may be arranged in a plurality of applications, such as, but not limited to:

a) Hospitals—to reduce airborne pathogens and other troublesome particulates;

b) Commercial office buildings, residential buildings, shopping centers, warehouses, and distribution centers—relatively high-volume spaces where the indoor air may have limited natural movement and is not exposed to sunlight to provide for natural ionization;

c) Transportation via aviation, automobiles, trains and subway systems, and elevators—relatively low volume spaces where the internal air is less likely to be circulated externally for extended periods;

d) Laboratories—the present invention could be utilized in this application as a failsafe to limit or manage a potential outbreak, or a cleanroom, where managing the concentration of airborne particulates is of the utmost importance; and, e) Government buildings, schools, prisons, and churches—are limited spaces where a great many people tend to gather, and these places are thus particularly more vulnerable to weaponized VOCs.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCES

The following references are incorporated by reference herein in their entireties:

a. U.S. Pat. No. 11,569,641, filed Nov. 16, 2020;

b. NRD, Models 2U500 RAIL, 1U400 RAIL & 1U200 RAIL ALPHA: Staticmaster® Linear Rail Ionizers, Data Sheet, https://nrdllc.com/product/staticmaster-ionizing-rail-model-2u500-rail/; and, c. NRD, Model P-2001 & P-2001-I: NUCLESTAT® Linear Ionizers, Data Sheet, https://nrdllc.com/product/nucle-stat-linear-ionizer-model-p-2001/.

REFERENCE NUMERALS

10 Frame
10*a* Member
10*b* Member
10*c* Member
10*d* Member
10*e* Internal surface
10*f* External surface
10*g* Internal space
12*a* Internal bracket
12*b* Internal bracket
14*a* Spacer
14*b* Spacer
14*c* Spacer
14*d* Spacer
20 Plurality of alpha emitter apparatuses
20*a* First alpha emitter apparatus
20*b* Second alpha emitter apparatus
20*c* Third alpha emitter apparatus
20*d* Fourth alpha emitter apparatus
20*e* Fifth alpha emitter apparatus
20*f* Sixth alpha emitter apparatus
22 Bias box
24 Output line
26 Output connector
28 Contact end
30 Aperture
32 Aperture
34 Aperture
36 Aperture
38 Aperture
40 Aperture
42 Fastener
44 Fastener
46 Fastener
48 Fastener
50 Fastener
52 Fastener
56 Aperture
58 Aperture
60 Aperture
62 Aperture
64 Aperture
66 Fastener
68 Fastener
70 Nut
72 Nut
74 Nut
76 Aperture
78 Aperture
80 Fastener
82 Fastener
84 Aperture
86 Aperture
88 Aperture
90 Aperture
92 Aperture
94 Fastener
96 Fastener
98 Nut
100 Technology box
102 Nut
104 Nut
106 Aperture
108 Aperture
110 Fastener
112 Fastener
114 Securement bracket
114*a* Channel
114*b* Channel
114*c* Cavity
116 Rail
116*a*-116*t* Sections
118 End cap
120 End cap
122 Plurality of trays
124 Tray
126 Channel
128 Channel
130 Cavity
132 Foils
132*a* Foil
132*b* Foil
134 Grid
136 Label
140 Ionizing apparatus
142 Duct portion with ionizing apparatus
144 Register
146 Exhaust section
148 Duct section
150 Air passageway
152 Duct portion with ionizing apparatus
154 Duct section
156 Air passageway
158 Bracket
160 Fastener
162 Fastener
164 Bracket
AD1 Axial direction
AD2 Axial direction
AD3 Axial direction
AD4 Axial direction
DE Downstream end
UE Upstream end

What is claimed is:

1. A device for treating air with alpha radioisotope ionization, comprising:

a housing having: a frame defining an internal space; and, a pair of internal brackets connected to the frame and disposed within the internal space;

one or more alpha emitter apparatuses, each of which have a securement bracket arranged within the housing, each of the alpha emitter apparatuses arranged to emit alpha particles creating ions, including anions and cations, the alpha particles created by a sealed source radioactive isotope encapsulated in the one or more alpha emitter apparatuses, wherein the seal protects the environment from contact with the isotope; and, a biasing means for applying a high voltage, low current signal to the one or more alpha emitters, the current signal arranged to regulate the ion concentration of the ions; wherein each of the securement brackets of the one or more alpha emitter apparatuses are arranged to be removably connected to both of the pair of internal brackets.

2. The device recited in claim 1, wherein the biasing means regulates the ion balance to achieve a predetermined target ion balance.

3. The device recited in claim 1, wherein each of the one or more alpha emitter apparatuses include a plurality of metallization layers configured to form a seal that encapsulates the sealed source radioactive isotope.

4. The device recited in claim 1, wherein the housing is arranged to be affixed with an air pathway.

5. The device recited in claim 4, wherein said air pathway is a HVAC duct.

6. The device recited in claim 1, further comprising a sensor in communication with a bias box, the sensor arranged to detect the ions and communicate the detection to at least one of: the bias box; and, an external device.

7. A device for treating air with alpha radioisotope ionization, comprising:

a frame having an internal surface, the internal surface defining an internal space;

a pair of internal brackets arranged within the internal space and removably connected to the frame, each internal bracket arranged to have at least one spacer arranged between the respective bracket and the internal surface of the frame; and, at least one alpha ionizing apparatus removably connected to the pair of internal brackets.

8. The device for treating air with alpha radioisotope ionization recited in claim 7, wherein the frame is arranged to be seated within an air passageway.

9. The device for treating air with alpha radioisotope ionization recited in claim 7, further comprising a bias box in electrical communication with at least one of: one of the pair of internal brackets; and, the at least one alpha ionizing apparatus.

10. The device for treating air with alpha radioisotope ionization recited in claim 9, wherein:

the pair of internal brackets are made of a conductive material;

the at least one alpha ionizing apparatus is at least partially made of a conductive material; and, the at least one spacer is made of a non-conductive material.

11. The device for treating air with alpha radioisotope ionization in claim 7, wherein the at least one alpha ionizing apparatus comprises:

a securement bracket including:

a pair of channels; and, a cavity; and, a rail arranged to be removably secured within the cavity, the rail including a pair of end caps disposed at opposite ends and a plurality of trays arranged between the pair of end caps, each tray of the plurality of trays includes:

a sub-tray having a pair of channels therein and a cavity therein;

at least one foil arranged to be seated within the cavity of the sub-tray; and, a grid arranged to be removably seated within the cavity of the sub-tray and secured therein by the pair of channels of the sub-tray.

12. A method for treating air with alpha radioisotope ionization, comprising the step of securing the frame of the device recited in claim 11 within an air passageway.

13. A device for treating air with alpha radioisotope ionization, comprising:

at least one alpha ionizing apparatus having a removable securement bracket; and, at least one mounting bracket arranged to removably secure to the securement bracket, wherein the at least one mounting bracket is arranged to be secured to an internal surface of an air passageway.

14. The device for treating air with alpha radioisotope ionization recited in claim 13, wherein the at least one alpha ionizing apparatus further comprises:

the securement bracket including:

a pair of channels; and, a cavity; and, a rail arranged to be removably secured within the cavity, the rail including a pair of end caps disposed at opposite ends and a plurality of trays arranged between the pair of end caps, each tray of the plurality of trays includes:

a sub-tray having a pair of channels therein and a cavity therein;

at least one foil arranged to be seated within the cavity of the sub-tray; and, a grid arranged to be removably seated within the cavity of the sub-tray and secured therein by the pair of channels of the sub-tray.

15. The device for treating air with alpha radioisotope ionization recited in claim 14, wherein the air passageway is a duct.

16. A method for treating air with alpha radioisotope ionization by securing the device recited in claim 12 within the air passageway via the at least one mounting bracket.

17. The method recited in claim 16, wherein the air passageway is a duct.

18. The device for treating air with alpha radioisotope ionization recited in claim 14, further comprising a bias box in electrical communication with at least one of: the at least one mounting bracket; and, the at least one alpha ionizing apparatus.

19. The device for treating air with alpha radioisotope ionization recited in claim 18, wherein:

the at least one mounting bracket is made of a conductive material; and, the at least one alpha ionizing apparatus is at least partially made of a conductive material.

20. A device for treating air with alpha radioisotope ionization, comprising:

a housing;

one or more alpha emitter apparatuses, each of which have a securement bracket arranged within the housing, each of the alpha emitter apparatuses arranged to emit alpha particles creating ions, including anions and cations, the alpha particles created by a sealed source radioactive isotope encapsulated in the one or more alpha emitter apparatuses, wherein the seal protects the environment from contact with the isotope; and, a biasing means for applying a high voltage, low current signal to the one or more alpha emitters, the current signal arranged to regulate the ion concentration of the ions, wherein the biasing means regulates the ion balance to achieve a predetermined target ion balance.

* * * * *